(12) United States Patent
Kracker et al.

(10) Patent No.: US 7,876,209 B2
(45) Date of Patent: Jan. 25, 2011

(54) VEHICLE SIGNAL SYSTEM WITH AUDIO VISUAL CONTROL AND METHOD

(75) Inventors: Thomas Kracker, Raymond, OH (US); Tony Wang, Raymond, OH (US); William Tobin, Raymond, OH (US); Derek Adelman, Raymond, OH (US)

(73) Assignee: Honda Motor Co., Ltd., Tokyo (JP)

( * ) Notice: Subject to any disclaimer, the term of this patent is extended or adjusted under 35 U.S.C. 154(b) by 324 days.

(21) Appl. No.: 12/142,285

(22) Filed: Jun. 19, 2008

(65) Prior Publication Data

US 2009/0167519 A1    Jul. 2, 2009

Related U.S. Application Data

(60) Provisional application No. 61/018,438, filed on Dec. 31, 2007.

(51) Int. Cl.
*B60Q 1/34* (2006.01)
(52) U.S. Cl. .................. 340/475; 340/476; 340/465; 340/433; 340/463; 340/474; 340/384.1
(58) Field of Classification Search .............. 340/475, 340/476, 465, 433, 463, 474, 384.1
See application file for complete search history.

(56) References Cited

U.S. PATENT DOCUMENTS

| | | | |
|---|---|---|---|
| 4,839,749 A | 6/1989 | Franklin | |
| 5,455,558 A | 10/1995 | Gregory | |
| 5,525,977 A | 6/1996 | Suman | |
| 5,646,590 A | 7/1997 | Dembicks | |
| 5,790,017 A | 8/1998 | Berryhill | |
| 5,801,622 A | 9/1998 | Chunick | |
| 5,905,434 A | 5/1999 | Steffan et al. | |
| 6,304,175 B1 | 10/2001 | Patrick | |
| 6,426,695 B2 * | 7/2002 | Pagano et al. | 340/475 |
| 2003/0033214 A1 | 2/2003 | Mikkelsen et al. | |
| 2003/0160688 A1 | 8/2003 | Kim et al. | |
| 2008/0136617 A1 * | 6/2008 | White et al. | 340/474 |

* cited by examiner

*Primary Examiner*—Tai T Nguyen
(74) *Attorney, Agent, or Firm*—Kenealy Vaidya LLP; Mark E. Duell

(57) ABSTRACT

An audio visual turn/hazard signaling system in a vehicle can include an electronic user-selectable sound file, a control circuitry containing a solid state relay, a sensor, and an amplifier. The signal system of the invention provides a customizable signal system including a sound file where the operator can choose the volume and frequency to play when turn signal is activated. The signal system of the invention also provides an automatic volume adjuster wherein the safety of the operator while operating a vehicle is enhanced.

14 Claims, 3 Drawing Sheets

VEHICLE SIGNAL SYSTEM WITH AUDIO VISUAL CONTROL AND METHOD

This application and invention claims the priority benefit under 35 U.S.C. §119 of U.S. Provisional Patent Application No. 61/018,438 filed on Dec. 31, 2007, which is hereby incorporated in its entirety by reference.

BACKGROUND

1. Field

The disclosed subject matter relates to a turning/hazard sound system and method for vehicles and, more particularly, to a turning/hazard sound system that is adjustable and customizable by the vehicle operator.

2. Brief Description of the Related Art

Most motor vehicles are equipped with a signaling system, which includes turn and hazard signals. Turn signals (properly referred to as "directional indicators" or "directional signals", also "indicators," "directionals," "blinkers," or "flashers") are signal lights mounted near the left and right front and rear corners, and sometimes on the sides and/or external rear-view mirrors of vehicles. They are used to indicate to other drivers that the vehicle operator intends a lateral change of position (turn or lane change). Turn signals are activated, in most cases, through a horizontal lever protruding from the side of the steering column, or alternately though a lever mounted on the dashboard. In virtually all left-hand drive cars, the lever is on the left side of the column, and the driver moves the lever up to activate the right turn signal, or down to activate the left. In right-hand drive cars, the placement of the signal lever varies by maker and market. When the lever is located on the right side of the column, the lever is moved down to signal a right turn, up to signal a left. The direction in which the lever must be moved is intuitive, in that the lever must be pivoted to signal in the same direction as the steering wheel must be turned for the car to make either a left or a right turn.

Conventional turn signals also include lights on the dashboard that blink on-and-off in synchronization with the blinking of the exterior lights. In addition, an audible "clicking" sound is often produced that is also synchronized with the blinking of the exterior lights. The dashboard lights and audible clicking sound serve to inform the operator of the vehicle that a turn signal is activated.

One problem with conventional turn signals, however, is that the turn that the operator of the vehicle makes must be sufficiently wide for the mechanical control device to deactivate the turn signal indicator. If the operator only makes a shallow angle turn, for example, when switching lanes on a highway, the mechanical device does not automatically deactivate the turn signal indicator. Consequently, if the operator does not notice the flashing light on the dashboard or does not hear the "clicking" sound, he/she travels along the highway with his/her turn signal indicator flashing on and off, when no turning maneuver is immediately planned. This can result in an accident by giving other motorists inaccurate information about the intentions of the vehicle's operator.

As mentioned above, the dashboard lights and the clicking sound serve to notify the vehicle operator when a turn signal is activated. Since the operator usually focuses on the road, on many occasions, the dashboard lights may not be effective. Furthermore, the clicking sound is often not heard because of hearing impaired operators, traffic noise, the vehicle radio, or simply because the clicking sound is too soft.

Thus, it would be desirable to provide a turning/hazard light sound system that could be adjusted and customized by the vehicle operator based on the speed of the vehicle and associated ambient noise.

SUMMARY

In accordance with the disclosed embodiments, a vehicle turn signal/hazard light sound system is provided which includes an electronic user-selectable sound file, a volume controller for selecting and adjusting at least one of a volume and a frequency, a control circuitry for activating and deactivating the electronic user-selectable sound file and the selected at least one of volume and frequency and a sound emitting device for emitting the selected sound file and the at least one volume and frequency.

In accordance with another aspect of the disclosed subject matter, there is provided a vehicle turn signal indicating system wherein the control circuitry contains an electronic solid state relay or intelligent power device.

In accordance with yet another aspect of the disclosed subject matter, the vehicle turn signal indicating system sensor is an ambient sensor.

In accordance with still another aspect of the disclosed subject matter, the vehicle turn signal indicating system amplifier is operatively interconnected to the vehicle sound system.

In accordance with still another aspect of the disclosed subject matter, the vehicle turn signal indicating system volume controller is operatively interconnected to a vehicle graphical user interface.

In accordance with still another aspect of the disclosed subject matter, the vehicle turn signal indicating system volume controller contains a user-selectable volume and frequency.

In accordance with another aspect of the disclosed subject matter, the vehicle turn signal indicating system volume controller contains an automatic volume adjuster.

In accordance with another aspect of the disclosed subject matter, the vehicle turn signal indicating system operates when the vehicle ignition is in the on or off position.

In accordance with still another aspect of the disclosed subject matter, there is provided a method of controlling the volume of a vehicle turn signal indicating system, comprising selecting at least one of a volume and a frequency, selecting an electronic sound file, retrieving the selected electronic sound file and generating a sound based upon the selected sound file and the selected at least one volume and frequency.

In accordance with yet another aspect of the disclosed subject matter, there is provided a vehicle signal system for providing a customized audio signal to indicate when an indicator turn signal light is activated comprising one or more sound files wherein the sound is captured and stored in an electronic format, a control circuitry for activating and deactivating said one or more sound files, a sensor operatively interconnected to the control circuitry, an amplifier operatively interconnected to the control circuitry and sensor, a volume controller operatively interconnected to the amplifier, and a sound emitter.

In accordance with yet another aspect of the disclosed subject matter, the vehicle signal system for providing a customized audio signal further comprises one or more sound files selected from a clicking sound, a beeping sound, a buzzing sound, and a user-recorded sound.

In accordance with still another aspect of the disclosed subject matter, the vehicle signal system for providing a customized audio signal further comprises one or more sound files wherein the electronic format is selected from a .wav file, a MP3 file, a .wma file, an .ogg file, a .aif file, an .aifc file, an .au file, and an .ea file.

In accordance with another aspect of the disclosed subject matter, the vehicle signal system for providing a customized audio signal includes the operator's ability to manually adjust the volume and frequency of the one or more sound files.

Still other features and attendant characteristics of the disclosed subject matter will become apparent to those skilled in the art from a reading of the following detailed description of embodiments constructed in accordance therewith, and taken in conjunction with the accompanying drawings.

BRIEF DESCRIPTION OF THE DRAWINGS

The disclosed subject matter will now be described in more detail with reference to exemplary embodiments of the apparatus and method, given only by way of example, and with reference to the accompanying drawings, as follows.

DETAILED DESCRIPTION OF EXEMPLARY EMBODIMENTS

Figure 1:
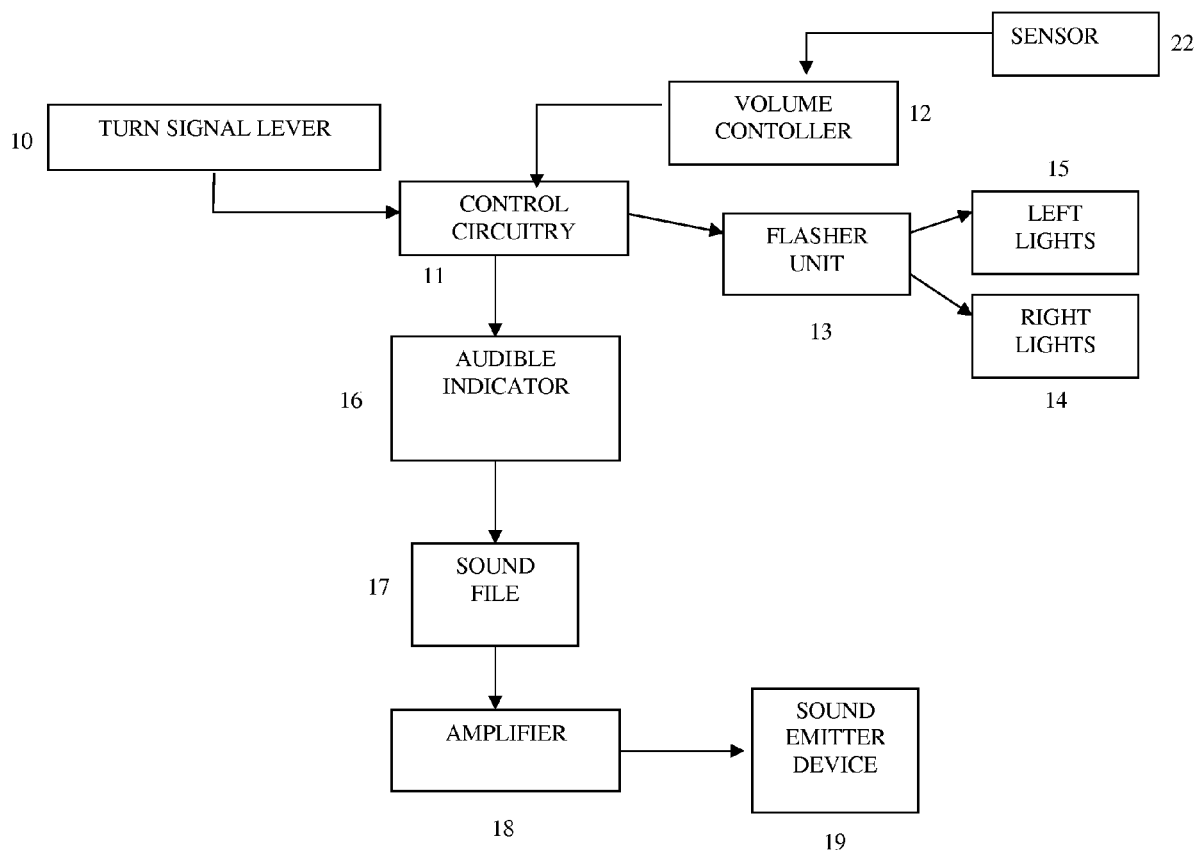
FIG. 1 is a representation of a turn signal system made in accordance with the principles of the disclosed subject matter.

Referring to the drawing figures, like reference numerals designate identical or corresponding elements throughout the several figures.

FIG. 1 is block diagram of a turn signal system in accordance with the principles of the disclosed subject matter. As illustrated in FIG. 1, the turn signal system can include a turn signal lever or arm 10, a control circuitry 11, a volume controller 12, an amplifier 18, one or more right indicator lights 14, one or more left indicator lights 15, a flasher unit 13, an audible indicator 16, a sound file 17, and a sound emitter device 19. The components of the invention as shown in FIG. 1 are all electrically operatively interconnected.

The lever 10, which is usually mounted on the steering column, generally has three positions: neutral, first and second position. For example, the first position typically indicates an anticipated left turn by the vehicle. In a left-hand drive vehicle, the first position occurs where the lever 10 is moved to the down (lower) position. In a right-hand drive vehicle, the first position occurs where the lever 10 is moved to the up (upper) position. The lever 10 is operatively interconnected to the control circuitry 11. The control circuitry 11 is operatively interconnected to the flasher unit 13 and the audible indicator 16, and the control circuitry 11 controls the energization of the flasher unit 13 and the audible indicator 16.

The control circuitry 11 can contain a solid state relay (SSR), or an intelligent power device. An SSR refers to electronic switching without any mechanical means and is preferred since it has no moving components and thus it has long term reliability. The SSR may be selected from a triac (TRIode for alternating current), SCR (silicon controlled rectifier), HexFet® MOSFET (metal-oxide-semiconductor field-effect transistor) or high-speed MOSFET.

The volume controller 12 is also operatively interconnected to the control circuitry 10 and interfaces with a sensor 22 that provides ambient noise data and can automatically increase the volume of the audible indicator 16 based on a user defined level above ambient noise. Ambient noise is produced by, for example, vehicle speed input and road noise sound. Other ambient noise, such as wind noise through an open vehicle window, or interior cabin noise (such as a vehicle cooling fan), also may be detected by the sensor 22.

The volume controller 12 also has a manual user input, where the vehicle operator can adjust the base volume and/or the frequency of the click or other sound to his/her preferred listening level through a graphical user interface by meter MID, navigation system display or external laptop. The volume controller 12 may have an analog and/or digital input, which are both embodiments of the present invention.

As discussed, the vehicle operator can adjust the frequency of the click or other sound by manipulating the volume controller. The human ear is typically less sensitive to lower frequencies within the audible sound spectrum, and this discrimination against lower frequencies becomes even greater as the sounds become softer in volume. Further, some individuals with auditory difficulties such as hearing disorders and age-related hearing loss may have increased or decreased sensitivity to certain sound frequencies. The disclosed system allows the user to adjust the frequency of the sound indicator so that a particularly noticeable or pleasant sound is generated that immediately provides notice to the operator of the vehicle turn signal status. Moreover, since more than one person may operate the vehicle, the sound can be customized to suit the needs of each operator.

The right and left indicator lights (14 and 15, respectively) include both exterior and dashboard lamps (not shown) which are both controlled by the flasher unit 13. The audible indicator 16 controls the sound file 17, and a selection of sounds are stored as individual sound files 17 and are selected from a conventional clicking sound (default setting), and customized sounds such as alarms, beeps, buzzes, and recorded messages in multiple languages and formats. Examples of sound file formats include, but are not limited to, waveform audio (.wav) files, MPEG-1 audio layer (.MP3) files, Windows media audio (.wma) files, Ogg Vorbis (.ogg) files, audio interchange (.aif, .aifc, .aiff.) files, Sun audio (.au) files and Emblaze audio (.ea) files.

The sound emitter device 19 is selected from one or more speakers or other sound emitter devices, which emitters 19 may be factory-installed devices such as car audio speakers, or may be after-market installed devices such as custom audio speakers or other devices. The speaker can be the same speaker that is used for the vehicle radio or stereo system. The amplifier 18 includes an operational amplifier (op amp) that can be any type of op amp suitable for audio amplification. The system of the present invention may interface directly with the existing vehicle audio amplifier, or may optionally include a dedicated op amp in addition to (or instead of) the vehicle amplifier.

Figure 2:
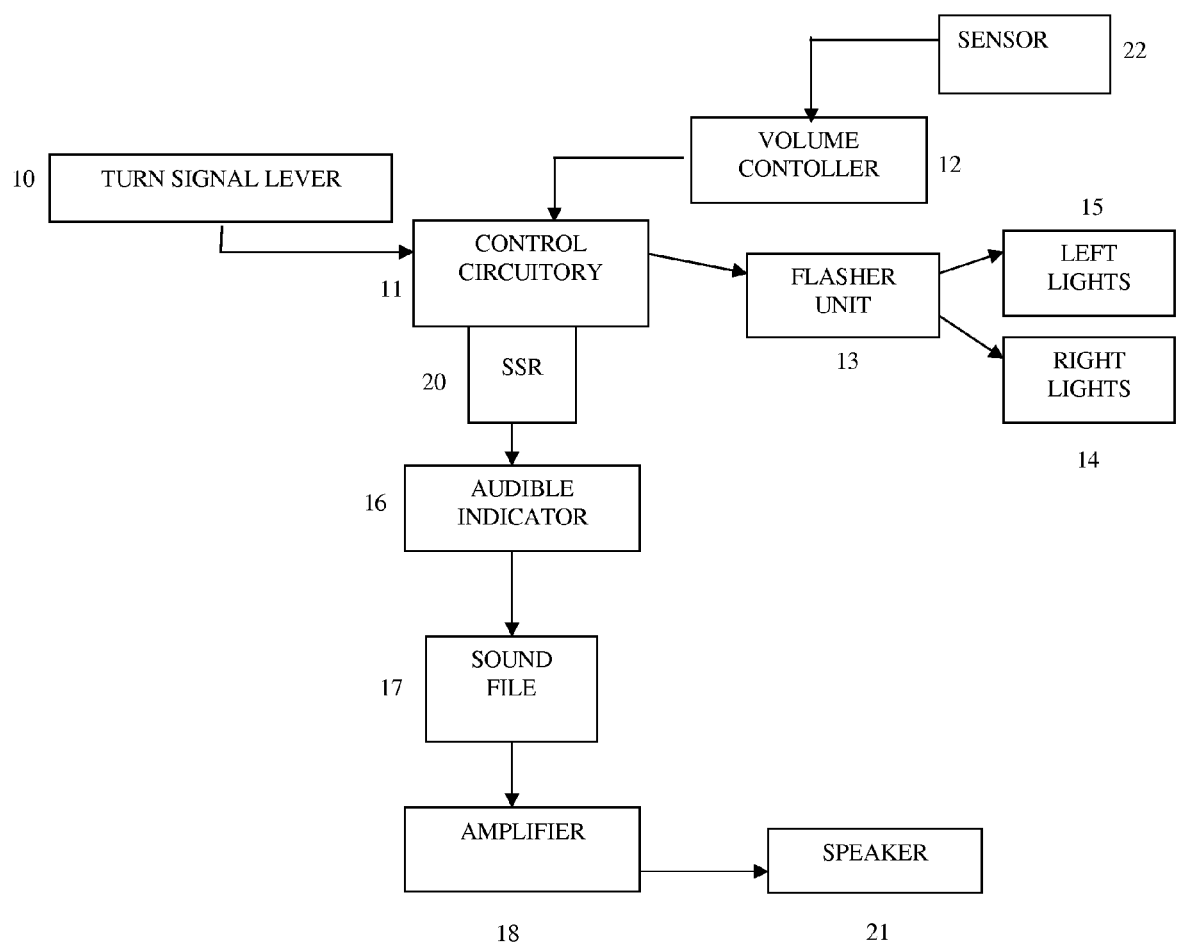
FIG. 2 is a representation of a preferred embodiment of the turn signal system made in accordance with the principles of the disclosed subject matter.

FIG. 2 is a representation of a preferred embodiment of the turn signal system made in accordance with the principles of the disclosed subject matter. In the embodiment shown in FIG. 2, the control circuitry 11 contains an SSR 20. Upon actuating the left turn signal selector, such as by moving the turn signal lever 10 to the down position or first position for a left turn, the relay 20 is activated. The relay 20 controls the flasher unit 13 and the audible indicator 16. Upon activation, the SSR 20 diverts power to the turn signals through the flasher unit 13 through a contact point, which causes the left turn signals to flash. The SSR 20 also engages the audible indicator 16 through contact points, which activates the sound file 17. The amplifier 18 amplifies the sound according to the volume control input, after which sound is transmitted to the speaker 21 and is broadcast into the operator compartment.

The volume of the sound can be adjusted in two ways. First, the sound is manually adjusted by the operator to a base volume level, such as through a graphical user interface. Second, after a preferred base volume level is chosen, the automatic volume controller 12 (which is also activated by the relay 20) compensates for the ambient noise (e.g., road noise and the vehicle speed data input) and automatically adjusts the volume accordingly, such as by increasing the volume where ambient noise is significant. This compensation level is determined by the data input from the sensor 22, such that the automatic volume level adjustment reflects a constant relative volume change above the ambient noise level. The sensor 22 may be a single sensor located in the operator's compartment of the vehicle, or may alternatively be a series of two or more sensors located in various positions throughout the vehicle compartment. As the one or more sensors 22 provide ambient noise data to the volume controller 12, the volume controller 12 electronically processes and interprets the ambient noise data to provide an appropriate sound adjustment level to the amplifier, so that the volume is correspondingly adjusted as output from the sound emitter device 19 or speaker 21.

In an embodiment of the invention, the vehicle operator manually chooses whether the sound file is activated when the vehicle ignition is in the off position. For example, when the vehicle ignition is off, a vehicle turn signal indicator typically does not operate, in order to minimize electrical current draw from the vehicle battery. However, regardless of the vehicle ignition status, when the emergency hazard indicators are activated in many vehicles, the vehicle turn indicators both flash and the sound associated with the turn signal indicators of such a hazard indicator is activated (depending on the particular vehicle make and model). The system of the present invention permits the vehicle operator to initially determine whether the sound file for one or both of the turn signals is activated when the vehicle hazard indicator is engaged and the vehicle ignition is in the off position. Similarly, where the vehicle ignition is in the off position and one of the turn signal indicators is activated, the user may also choose whether the sound file is activated along with the flashing indicator light on the vehicle dashboard in concert with the turn signal.

Figure 3:
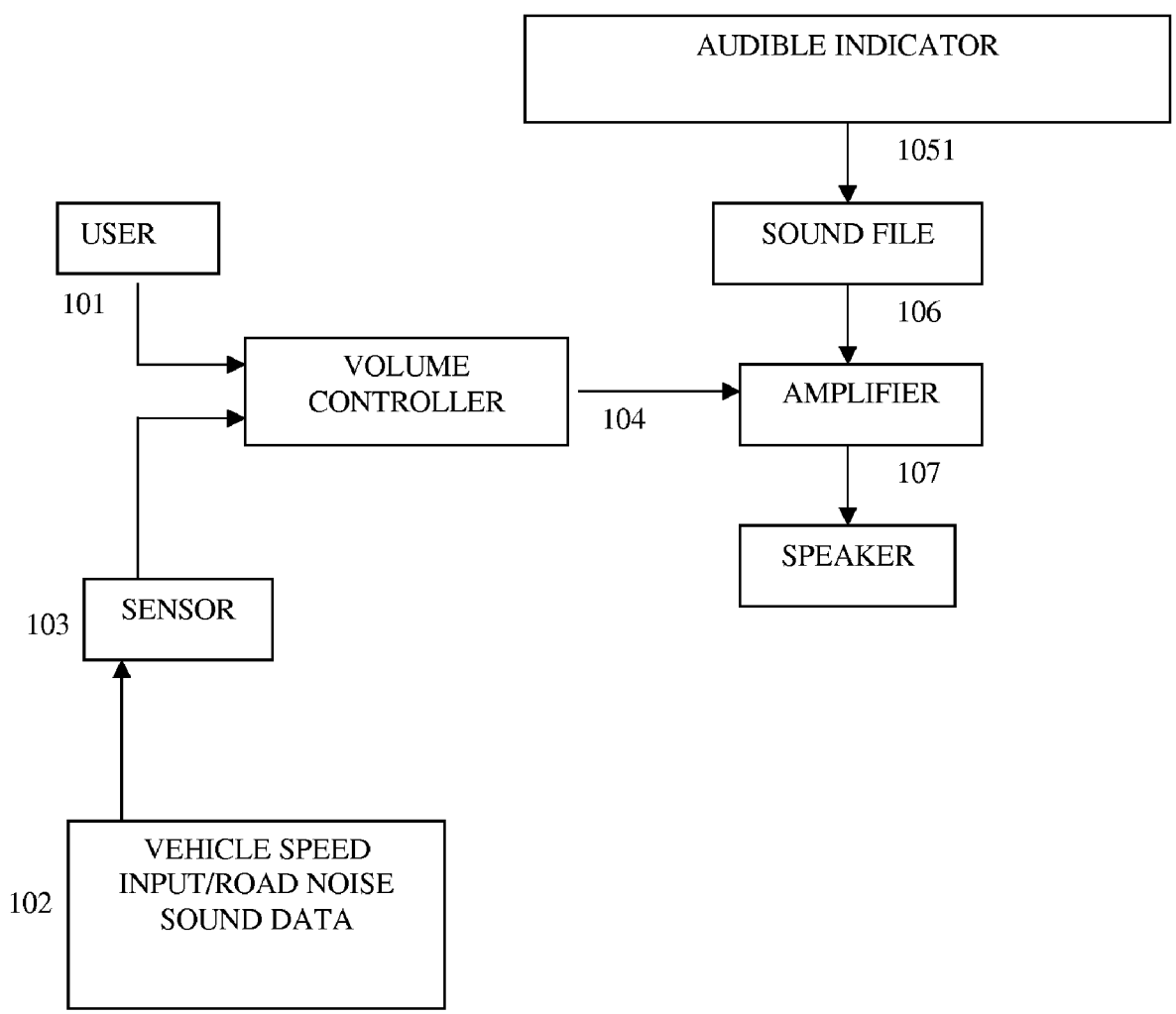
FIG. 3 is a flowchart that describes the operation of a volume control for a turn signal system made in accordance with principles of the disclosed subject matter.

FIG. 3 provides a flowchart of an embodiment of the invention showing the operation of automatic or user-determined volume control for a turn signal system made in accordance with the principles of the disclosed subject matter. In step 101, a user manually operates a volume adjustment control that is responsive to actuation by the operator, for controllably adjusting the initial (baseline) volume of the sound chosen from a sound file. Thus, the volume controller input is initially set to a default frequency and volume level for the signal indicator system. This default volume level may be referred to as a baseline user-preferred level. During operation of the vehicle, step 102 provides that the vehicle speed input, road noise sound data, and other ambient noise data are electronically sensed by a sensor. The sensor in step 103 in turn conveys the electronic noise data to the volume controller, whereby the volume controller automatically controls the volume level by electronically communicating with the amplifier in step 104. In step 107, the amplifier output generates sound through the speaker or other sound emitter device in response to the volume as dictated by the volume controller.

In step 105, the audible indicator, which is triggered by the turn signal lever, in turn activates the sound file to pass a sound electronically to the amplifier as indicated in step 106. The amplifier is controlled by the volume controller in step 104 (as described), and the amplifier causes the speaker in step 107 to emit the chosen sound file to the operator through the speaker. This action provides an effective and controlled volume adjustment for the turn signal without constantly engaging the operator for volume adjustment while operating a vehicle.

Although certain embodiments of the disclosed subject matter are described above, it should be understood that the disclosed subject matter can be embodied and configured in many different ways without departing from the spirit and scope of the invention. Moreover, the system of the presently disclosed subject matter can operatively interface directly with a factory-installed vehicle electrical system, including the audio and video entertainment systems of the vehicle, as well as any graphical user interface employed in the vehicle, including a meter which has a speaker on the circuit board. The system may also interface with an after-market installed vehicle electrical system, audio/video entertainment system and graphical user interface.

While the disclosed subject matter has been described in detail with reference to exemplary embodiments thereof, it will be apparent to one skilled in the art that various changes can be made, and equivalents employed, without departing from the scope of the invention. Each of the aforementioned conventional art documents is hereby incorporated by reference herein in its entirety.

What is claimed is:

1. A vehicle turn signal indicating system comprising:
   an electronic user-selectable sound file;
   a volume controller for selecting and adjusting at least one of a volume and a frequency;
   a control circuitry for activating and deactivating the electronic user-selectable sound file and the selected at least one of volume and frequency upon actuation of or after receiving a signal from a signal selector;
   a sound emitting device for emitting the selected sound file and the at least one volume and frequency a sensor operatively interconnected to the control circuitry, the sensor detecting an ambient sound level; and
   an amplifier operatively interconnected to the control circuitry and the sound emitting device.

2. The vehicle turn signal indicating system of claim 1, wherein the control circuitry includes one of an electronic solid state relay and an intelligent power device.

3. The vehicle turn signal indicating system of claim 1, wherein the sensor is an ambient sensor.

4. The vehicle turn signal indicating system of claim 1, wherein the volume controller receives user input from a vehicle graphical user interface.

5. The vehicle turn signal indicating system of claim 1, wherein the at least one of volume and frequency is manually selected by a user.

6. The vehicle turn signal indicating system of claim 1, wherein the at least one of volume and frequency is based upon input from the sensor.

7. The vehicle turn signal indicating system of claim 1, wherein said system operates when a vehicle ignition is in the on or off position.

8. The vehicle turn signal indicating system of claim 1, wherein sound emitting device is a vehicle sound system including at least one vehicle speaker.

9. A method of controlling a volume of a vehicle turn signal indicating system, comprising:
   selecting at least one of a volume and a frequency;
   selecting an electronic sound file;
   retrieving the selected electronic sound file upon actuation of or after receiving a signal from a signal selector;

generating a sound based upon the selected sound file and the selected at least one volume and frequency measuring an ambient noise; and adjusting the sound automatically based upon the measured ambient noise.

10. A vehicle signal system for providing a customized audio signal to indicate when an indicator turn signal light is activated comprising:

one or more sound files wherein a sound is captured and stored in an electronic format;

a control circuitry for activating and deactivating said one or more sound files upon actuation of or after receiving a signal from a signal selector;

an ambient noise sensor operatively interconnected to the control circuitry;

an amplifier operatively interconnected to the control circuitry and sensor;

a volume controller operatively interconnected to the amplifier; and a sound emitter device.

11. The vehicle signal system of claim 10, wherein the one or more sound files are selected from a clicking sound, a beeping sound, a buzzing sound, and a user-recorded sound.

12. The vehicle signal system of claim 10, wherein the electronic format is selected from a .wav file, a MP3 file, a .wma file, an .ogg file, a .aif file, an .aifc file, an .au file, and an .ea file.

13. The vehicle signal system of claim 11, wherein the volume and frequency of said one or more sound files can be manually adjusted by an operator.

14. A vehicle signal system for providing a customized audio signal, comprising:

means for storing an electronic user-selectable sound file;

means for selecting and adjusting at least one of a volume and a frequency;

means for activating and deactivating the electronic user-selectable sound file and the selected at least one of volume and frequency upon actuation of or after receiving a signal from a signal selector;

means for emitting the selected sound file and the at least one volume and frequency;

means for detecting an ambient sound level; and means for amplifying the volume operatively interconnected to the means for activating and deactivating and the means for emitting.

* * * * *